US008225286B2

(12) United States Patent
Stall et al.

(10) Patent No.: US 8,225,286 B2
(45) Date of Patent: Jul. 17, 2012

(54) DEBUGGING INTERPRETED INPUT

(75) Inventors: Jonathon Michael Stall, Bothell, WA (US); Richard M. Byers, Bellevue, WA (US); Steve J. Steiner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1384 days.

(21) Appl. No.: 11/419,962

(22) Filed: May 23, 2006

(65) Prior Publication Data
US 2007/0277165 A1 Nov. 29, 2007

(51) Int. Cl.
G06F 9/44 (2006.01)
(52) U.S. Cl. ........................ 717/124; 717/127
(58) Field of Classification Search .................. 717/124
See application file for complete search history.

(56) References Cited

U.S. PATENT DOCUMENTS

| | | | | |
|---|---|---|---|---|
| 5,814,714 A * | 9/1998 | Palomo et al. | ................ | 526/336 |
| 5,848,274 A * | 12/1998 | Hamby et al. | ................ | 717/153 |
| 6,063,133 A * | 5/2000 | Li et al. | .......................... | 717/136 |
| 6,064,817 A * | 5/2000 | Carter et al. | ................ | 717/114 |
| 6,253,368 B1 * | 6/2001 | Nelin et al. | ................ | 717/124 |
| 6,286,132 B1 * | 9/2001 | Tanaka et al. | ................ | 717/125 |
| 6,295,643 B1 * | 9/2001 | Brown et al. | ................ | 717/148 |
| 6,314,558 B1 * | 11/2001 | Angel et al. | ................ | 717/118 |
| 6,353,923 B1 * | 3/2002 | Bogle et al. | ................ | 717/128 |
| 6,463,578 B1 * | 10/2002 | Johnson | ........................ | 717/124 |
| 6,477,666 B1 * | 11/2002 | Sanchez et al. | ................ | 714/41 |
| 6,643,842 B2 * | 11/2003 | Angel et al. | ................ | 717/130 |
| 6,721,941 B1 * | 4/2004 | Morshed et al. | ................ | 717/127 |
| 6,760,903 B1 * | 7/2004 | Morshed et al. | ................ | 717/130 |
| 6,836,884 B1 * | 12/2004 | Evans et al. | ................ | 717/140 |
| 6,978,399 B2 * | 12/2005 | Bates et al. | ................ | 714/34 |
| 7,150,006 B2 * | 12/2006 | Bliss et al. | ................ | 717/124 |
| 7,203,926 B2 * | 4/2007 | Bogle et al. | ................ | 717/124 |
| 7,401,323 B2 * | 7/2008 | Stall et al. | ................ | 717/130 |
| 2003/0106046 A1 * | 6/2003 | Arnold et al. | ................ | 717/129 |
| 2003/0149961 A1 * | 8/2003 | Kawai et al. | ................ | 717/129 |
| 2004/0054944 A1 * | 3/2004 | Bates et al. | ................ | 714/38 |
| 2004/0133882 A1 * | 7/2004 | Angel et al. | ................ | 717/130 |
| 2004/0210876 A1 * | 10/2004 | Stall et al. | ................ | 717/127 |
| 2005/0028137 A1 * | 2/2005 | Evans et al. | ................ | 717/110 |
| 2006/0070039 A1 * | 3/2006 | Bates et al. | ................ | 717/129 |
| 2007/0074168 A1 * | 3/2007 | Bates et al. | ................ | 717/124 |
| 2007/0168972 A1 * | 7/2007 | Bates et al. | ................ | 717/124 |
| 2007/0250819 A1 * | 10/2007 | Fjeldstad et al. | ................ | 717/129 |
| 2009/0319999 A1 * | 12/2009 | Stall et al. | ................ | 717/128 |

* cited by examiner

*Primary Examiner* — Don Wong
*Assistant Examiner* — Marina Lee

(57) ABSTRACT

A method and system to implement debugging interpreted input is described herein. One or more Intermediate Language (IL) islands are generated. Each IL island maps to one or more lines of source code. The interpreter reads a line of source code and parses the line of source code for a command. Before executing the command, the interpreter may call into the corresponding IL island. The IL island may include a breakpoint that corresponds to a set breakpoint in the mapped one or more lines of source code. The IL island may include a function. When calling the IL island, the interpreter may pass in a function pointer, one or more states of one or more variables, a representation of a call stack, or any other parameters. The IL islands enable a debug tool to do source-level debugging of languages executed by an interpreter without architectural changes to the interpreter.

15 Claims, 3 Drawing Sheets

DEBUGGING INTERPRETED INPUT

BACKGROUND

A source file containing source code may be compiled via a compiler into an Intermediate Language (IL). Source code represents any of various types of computer programming codes written in any type of computer programming language. A compiler may be any computer program language compiler including but not limited to C, C++, C#, and Visual Basic. IL is platform independent and represents an intermediate stage of conversion between source code and platform specific native code for execution. Various debug tools can only debug code that has compiled to IL.

Many managed applications, such MSBuild and Monad, function as an interpreter on some source-level input. Typical managed-debuggers can only debug code that compiles to IL. Since the source-language input to these tools is interpreted and not compiled to IL, it is not debuggable with current managed-debuggers.

Such tools do not have a good debugging scenario for end-users debugging their inputs. Either the inputs are not debuggable, or end-users must use some highly-specialized debugger-tool written by the tool author. Such specialized debuggers are generally costly for the tool author to produce and have very limited functionality.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for debugging interpreted input. In accordance with one implementation of the described technologies, one or more Intermediate Language (IL) islands are generated. Each IL island maps to one or more lines of source code. The interpreter reads a line of source code and parses the line of source code for a command. Before executing the command, the interpreter may call into the corresponding IL island. The IL island may include a breakpoint that corresponds to a set breakpoint in the mapped one or more lines of source code. The IL island may include a function. When calling the IL island, the interpreter may pass in a function pointer, one or more states of one or more variables, a representation of a call stack, or any other parameters. The IL islands enable a debug tool to do source-level debugging of languages executed by an interpreter without architectural changes to the interpreter.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
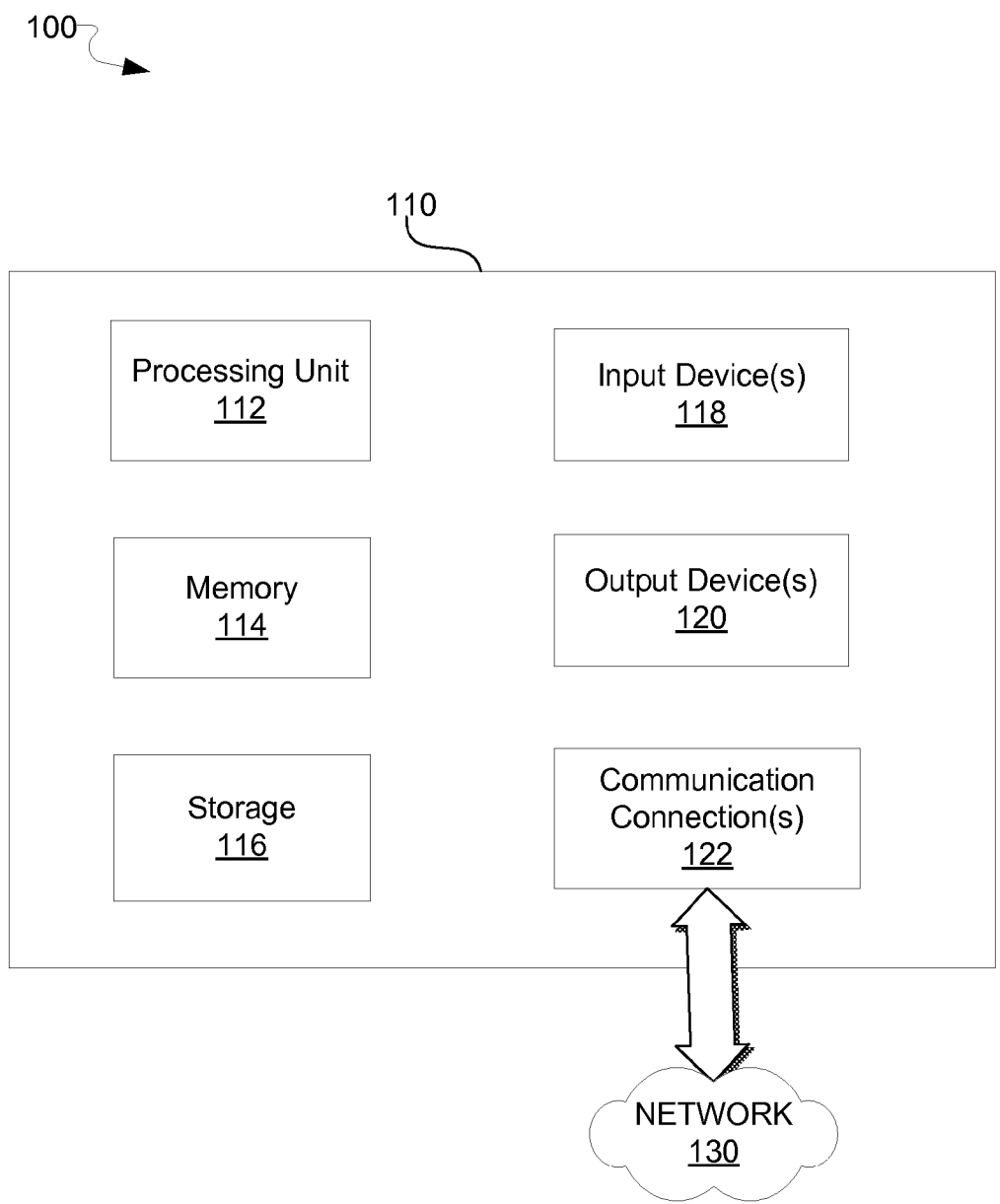
FIG. 1 illustrates an exemplary computing environment in which certain aspects of the invention may be implemented.

FIG. 1 illustrates an exemplary computing environment in which certain aspects of the invention may be implemented. It should be understood that computing environment 100 is only one example of a suitable computing environment in which the various technologies described herein may be employed and is not intended to suggest any limitation as to the scope of use or functionality of the technologies described herein. Neither should the computing environment 100 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, computing environment 100 includes a general purpose computing device 110. Components of computing device 110 may include, but are not limited to, a processing unit 112, a memory 114, a storage device 116, input device(s) 118, output device(s) 120, and communications connection(s) 122.

Processing unit 112 may include one or more general or special purpose processors, ASICs, or programmable logic chips. Depending on the configuration and type of computing device, memory 114 may be volatile (such as RAM), non-volatile (such as ROM, flash memory, etc.) or some combination of the two. Computing device 110 may also include additional storage (removable and/or non-removable) including, but not limited to, magnetic or optical disks or tape. Such additional storage is illustrated in FIG. 1 by storage 116. Computer storage media includes volatile and nonvolatile, removable and non-removable media implemented in any method or technology for storage of information such as computer readable instructions, data structures, program modules or other data. Memory 114 and storage 116 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 110. Any such computer storage media may be part of computing device 110.

Computing device 110 may also contain communication connection(s) 122 that allow the computing device 110 to communicate with other devices, such as with other computing devices through network 130. Communications connection(s) 122 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes storage media.

Computing device 110 may also have input device(s) 118 such as a keyboard, a mouse, a pen, a voice input device, a touch input device, and/or any other input device. Output device(s) 120 such as one or more displays, speakers, printers, and/or any other output device may also be included.

Figure 2:
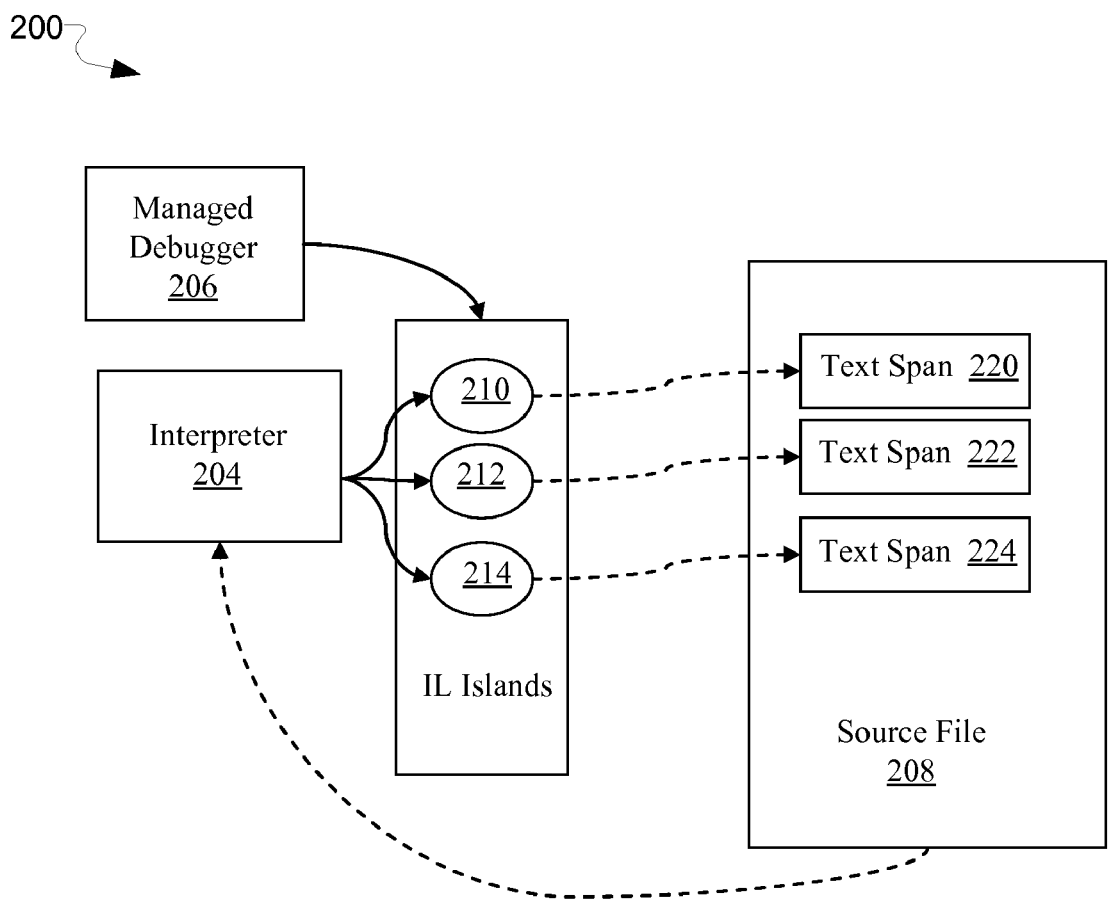
FIG. 2 is a block diagram illustrating an exemplary system for debugging interpreted input.

FIG. 2 is a block diagram illustrating an exemplary system 200 for debugging interpreted input. An interpreter 204 interprets each line of source code in a source file 208, parses the lines of source code for commands, and executes the commands. To enable debug of the source-level input by a managed debugger 206, one or more Intermediate Language (IL) islands, such as 210, 212, or 214, are generated. Each IL island maps to one or more lines of source code, such as represented by text spans 220, 222, or 224. The interpreter 204 may call the appropriate island when it is processing the corresponding one or more lines of source code, which signals to the debugger 206 that it is about to execute the one or more statements represented by the one or more lines of source code. This IL to source mapping makes it possible for the managed debugger 206 to debug the source-level input. An exemplary pseudo code implementation of an island is as follows:

```
Void Island ( ) {
    Nop
}
```

Various execution controls may be implemented via the use of IL islands. With the mapping of the IL islands to the source code in the source file 208, the managed debugger 206 may query what IL instruction the debuggee is stopped at and then use the mapping to show the user the proper source code.

When a source-level breakpoint is set in the source file 208, the managed debugger 206 may use the source to IL mapping to place a breakpoint at the IL instruction inside the corresponding IL island. When the interpreter 204 interprets the text span in the source file that contains the breakpoint, the interpreter 204 will call the corresponding IL island, which will hit the breakpoint. Thus, the interpreter 204 will stop at the appropriate island, and the debugger 206 will map that island back to the corresponding text span in the source file 208.

For step-over, code may be marked as "user" or "non-user" code, such as using a technology called "Just My Code", described in detail in U.S. application Ser. No. 10/419,384, filed Apr. 21, 2003. The IL islands may be marked as "user" code, while interpreter code may be marked as "non-user" code. In this way, source-level step-over will only occur between the IL islands. Marking the interpreter as "user" code also provides a consistent model for debugging the actual interpreter.

For step-in, an IL island may invoke a callback function supplied by the interpreter 204. The interpreter 204 calls the IL island and passes in a function pointer. The IL island then calls the function, transferring control back to the interpreter. This allows the relative layout of the IL islands on the call stack to mimic the interpreted source's virtual call stack. The interpreter would then call the island that corresponds to the first one or more lines of the function code. If a debugger performs a step-in operation, it can then stop immediately at the next "user" code (for example, at the next island). If instead, the debugger performs a step-over operation, it can run until the callback from the island has completed, which may include calls to other islands and other operations in the interpreter. An exemplary pseudo code implementation of an IL island that invokes a callback function is as follows:

```
Void Island (Pointer_to_call fp) {
    Nop
    If (fp != null) { call fp( ); }
}
```

For inspection, the debugger 206 may inspect any parameters or local variables in the IL islands just as it would in compiled code. The interpreter 204 may add any local variables that it wants the debugger 206 to be able to inspect. Alternatively, the interpreter 204 may add a single parameter that points to a structure containing all locals. An exemplary pseudo code implementation of such an IL island is as follows:

```
Void Island (object locals) {
    Nop
}
```

The interpreter 204 may also add a parameter to the IL island that represents a virtual call stack of the source code. An exemplary pseudo code implementation of such an IL island is as follows:

```
Void Island (stack callstack) {
    Nop
}
```

The above are examples of various execution controls and inspection techniques that may be enabled via the use of IL islands. It is understood that other types of execution control and other debug features may be implemented with various other embodiments.

The following is an example for illustrative purposes. Suppose that the source code is as follows:

```
a = 1;        // mapped to Island 1
call B(a);    // mapped to Island 2
Def B(a)
print a + 2;  // mapped to Island 3
```

Each line of source code may be mapped to an island. The three islands may be as follows:

```
Island1 (a) {
}
Island2 (target) {
target ( );
}
Island3 (a) {
}
```

The interpreter may have code such as the following:

```
while (s = Readline( ) ) {
    c = parse (s);
    DebugHook( );
    c.exe( );
}
```

The interpreter would read the first line of code "a=1". The code would be parsed. Then, the interpreter would call into the debug hook, Island1, passing in the value of a. Nothing needs to be performed in Island1, so the process exits back to the interpreter. The command for line 1 is executed and a is set to 1. The next line of code is read and parsed. The interpreter calls into Island2, passing in a function pointer to code in the interpreter which would execute function B. Island2 calls back to the interpreter which begins executing function B. The interpreter then calls Island3, passing in the value of a, which is 1. Nothing needs to be performed in Island3, so the process exits back to the interpreter. The interpreter then executes the print command. By passing in the function pointer to Island2, calling back into the interpreter in Island2 to execute function B, and then having the interpreter call into Island3, which maps to the first line of function B's code, the real call stack may be made to mimic the interpreted source's virtual call stack.

It is understood that the above example is used for illustrative purposes. Other programming languages, programming code, and execution control may be used in other implementations.

Figure 3:
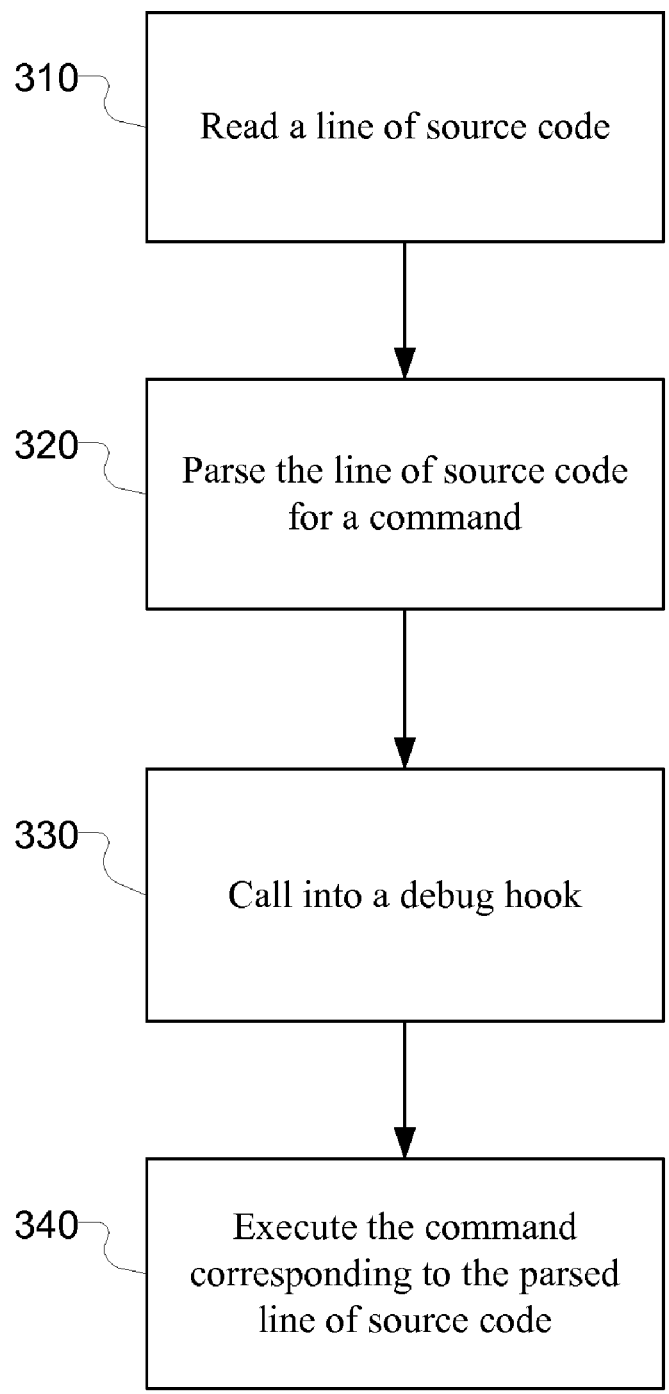
FIG. 3 is a flow diagram illustrating an exemplary process for debugging interpreted input.

FIG. 3 is a flow diagram illustrating an exemplary process for debugging interpreted input. While the description of FIG. 3 may be made with reference to other figures, it should be understood that the exemplary process illustrated in FIG. 3 is not intended to be limited to being associated with the systems or other contents of any specific figure or figures. Additionally, it should be understood that while the exemplary process of FIG. 3 indicates a particular order of operation execution, in one or more alternative implementations, the operations may be ordered differently. Furthermore, some of the steps and data illustrated in the exemplary process of FIG. 3 may not be necessary and may be omitted in some implementations. Finally, while the exemplary process of FIG. 3 contains multiple discrete steps, it should be recognized that in some environments some of these operations may be combined and executed at the same time.

At 310, the interpreter reads a line of source code. At 320, the line of source code is parsed for a command. At 330, a debug hook is called. The debug hook may be an IL island that maps to the line of source code. The IL island may contain a breakpoint that maps to a breakpoint set in the line of source code. The IL island may contain a function call. When the interpreter calls the IL island, the interpreter may pass in one or more states of one or more variables, a function pointer, a representation of a call stack, or any other parameter. At 340, the command corresponding to the parsed line of source code is executed.

The use of IL islands and the mapping of the islands to the source code enables a managed debugger to do source-level debugging of languages executed by an interpreter without architectural changes to the interpreter. Various execution control may be implemented as desired (as described above with respect to FIG. 2).

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A method comprising:
    generating a plurality of Intermediate Language (IL) islands, each of the plurality of IL islands being callable by an interpreter to enable a debugger to debug source code;
    including in at least one of the plurality of IL islands a call to a function;
    mapping each of the plurality of IL islands to a respective text span in the source code; interpreting the source code by the interpreter by parsing the source code for commands; and
    calling a respective one of the plurality of IL islands istan4 with the interpreter when processing the text span in the source code corresponding to the respective one of the plurality of IL islands, said calling signaling to the debugger that the interpreter is to execute the corresponding text span;
    said calling a respective one of the plurality of IL islands comprising passing a function pointer to the debugger.

2. The method of claim 1, further comprising placing a breakpoint inside one of the plurality of IL islands to correspond to a breakpoint set in the mapped text span.

3. The method of claim 2, wherein calling a respective one of the plurality of IL islands istan4 with the interpreter when processing the text span in the source code corresponding to the respective one of the plurality of IL islands comprises calling the respective one of the plurality of IL islands, hitting the breakpoint inside the respective one of the plurality of IL islands, and stopping execution.

4. The method of claim 1, further comprising marking the plurality of IL islands as user code to allow for step-over between the plurality of IL islands during debug by the debugger.

5. The method of claim 1, wherein calling a respective one of the plurality of IL islands comprises passing one or more states of one or more variables to the debugger.

6. The method of claim 1, wherein calling a respective one of the plurality of IL islands comprises passing a representation of a call stack to the debugger.

7. One or more device-readable computer storage media with device-executable instructions for performing steps comprising:
    reading a line of source code;
    parsing the line of source code for a command;
    calling into a debug hook, wherein the debug hook is a respective one of a plurality of Intermediate Language (IL) islands that maps to the line of source code, the respective one of the plurality of IL islands being callable by an interpreter to enable a debugger to debug the line of source code mapped to the respective one of the plurality of IL islands; and
    executing the command corresponding to the parsed line of source code;

said calling into the debug hook comprises
- calling the respective one of the plurality of IL islands and passing a function pointer, the function pointer pointing to a function in the source code, and
- calling the function pointed to by the function pointer and executing the function.

8. The one or more device-readable computer storage media of claim 7, wherein the steps further comprise hitting a breakpoint inside the respective one of the plurality of IL islands and stopping execution.

9. The one or more device-readable computer storage media of claim 7, wherein the steps further comprise stepping over from the respective one of the plurality of IL islands to another one of the plurality of IL islands.

10. The one or more device-readable computer storage media of claim 7, wherein calling into the debug hook comprises calling the respective on of the plurality of IL islands and passing one or more states of one or more variables to the debugger, wherein the debugger is configured to inspect the one or more variables.

11. The one or more device-readable computer storage media of claim 7, wherein calling into the debug hook comprises calling the respective one of the plurality of IL islands and passing a representation of a call stack to the debugger.

12. One or more device-readable computer storage media with device-executable instructions for performing steps comprising:
- generating a plurality of Intermediate Language (IL) islands, wherein each of the plurality of IL island maps to one or more lines of source code and is callable by an interpreter to enable debugging by a debugger;
- processing the source code that includes one or more lines of source code;
- calling a corresponding one of the plurality of IL islands when processing the one or more lines of source code to which the corresponding one of the plurality of IL islands maps; and
- debugging the one or more lines of source code by the debugger in response to the corresponding one of the plurality of IL islands mapped to the one or more lines of source code being called;
- said calling a corresponding one or more of the plurality of IL island comprises
  - passing a function pointer to the debugger, the function pointer pointing to a function, and
  - calling the function pointed to by the function pointer in the corresponding one or the plurality of IL islands.

13. The one or more device-readable computer storage media of claim 12, wherein the steps further comprise placing a breakpoint inside the corresponding one of the plurality of IL island islands mapped to the one or more lines of source code to correspond to a breakpoint set in the one or more lines of source code to which the corresponding one of the plurality of IL islands maps.

14. The one or more device-readable computer storage media of claim 12, wherein calling a corresponding one of the plurality of IL islands comprises passing one or more states of one or more variables to the debugger.

15. The one or more device-readable computer storage media of claim 12, wherein calling a corresponding one of the plurality of IL islands comprises passing a representation of a call stack to the debugger.

* * * * *